(12) United States Patent
Islam et al.

(10) Patent No.: US 7,639,004 B2
(45) Date of Patent: Dec. 29, 2009

(54) APPARATUS FOR SENSING ANGULAR DISPLACEMENT BETWEEN FIRST AND SECOND ROTATING SHAFTS INCLUDING FLUX COLLECTORS

(75) Inventors: Mohammed R. Islam, Saginaw, MI (US); Mohammad S. Islam, Saginaw, MI (US); Matthew W Mielke, Freeland, MI (US); Tomy Sebastian, Saginaw, MI (US); Sainan Feng, Saginaw, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 321 days.

(21) Appl. No.: 11/880,502

(22) Filed: Jul. 23, 2007

(65) Prior Publication Data

US 2009/0027045 A1    Jan. 29, 2009

(51) Int. Cl.
    *G01B 7/30* (2006.01)
(52) U.S. Cl. .................... 324/207.25; 324/207.2
(58) Field of Classification Search ............ None
    See application file for complete search history.

(56) References Cited

U.S. PATENT DOCUMENTS

| | | | |
|---|---|---|---|
| 4,672,247 A | 6/1987 | Madsen et al. | |
| 4,784,002 A | 11/1988 | Io | |
| 4,939,456 A | 7/1990 | Morelli et al. | |
| 4,984,474 A | 1/1991 | Matsushima et al. | |
| 5,434,504 A | 7/1995 | Hollis et al. | |
| 5,532,585 A | 7/1996 | Oudet et al. | |
| 5,627,465 A | 5/1997 | Alfors et al. | |
| 5,705,756 A | 1/1998 | LeMarquand et al. | |
| 5,818,038 A | 10/1998 | Kerkmann et al. | |
| 5,919,241 A | 7/1999 | Bolourchi et al. | |
| 6,161,644 A | 12/2000 | Kim | |
| 6,240,678 B1 | 6/2001 | Spether | |
| 6,356,073 B1 * | 3/2002 | Hamaoka et al. | 324/207.2 |
| 6,476,600 B2 | 11/2002 | Kono et al. | |
| 6,546,780 B1 | 4/2003 | Palfenier et al. | |
| 6,598,490 B2 | 7/2003 | Strothmann | |
| 6,907,794 B2 | 6/2005 | Arai | |
| 6,945,126 B2 | 9/2005 | Toratani et al. | |
| 7,021,161 B2 | 4/2006 | Recio et al. | |

(Continued)

FOREIGN PATENT DOCUMENTS

DE    198 16 831 A1    10/1999

(Continued)

*Primary Examiner*—Jay M Patidar
(74) *Attorney, Agent, or Firm*—Cantor Colburn LLP

(57) ABSTRACT

An apparatus for measuring relative displacement between a first shaft and a second shaft includes first and second rotor assemblies. The first rotor assembly is coupled to the first shaft and is centered on an axis. The second rotor assembly is coupled to the second shaft. The second rotor assembly has first and second stator plates. Each of the first and second stator plates includes an upper surface and a lower surface. The first and second stator plates include a plurality of teeth extending in a direction radial of the axis. The apparatus further includes at least one magnet having a magnetic field and disposed on the first rotor assembly. The apparatus includes a flux collector arrangement having first and second collectors positioned adjacent the first and second stator plates, respectively, forming a gap. A sensing device disposed within the gap senses a magnetic flux of the magnetic field.

20 Claims, 15 Drawing Sheets

U.S. PATENT DOCUMENTS

| | | |
|---|---|---|
| 7,055,397 B2 | 6/2006 | Nakajima et al. |
| 7,117,755 B2 | 10/2006 | Yang |
| 7,158,223 B2 | 1/2007 | Arai |
| 7,191,668 B2 | 3/2007 | Kitamura et al. |
| 2004/0011138 A1 | 1/2004 | Gandel et al. |

FOREIGN PATENT DOCUMENTS

| | | |
|---|---|---|
| DE | 198 17 886 A1 | 10/1999 |
| GB | 588677 | 5/1947 |

* cited by examiner

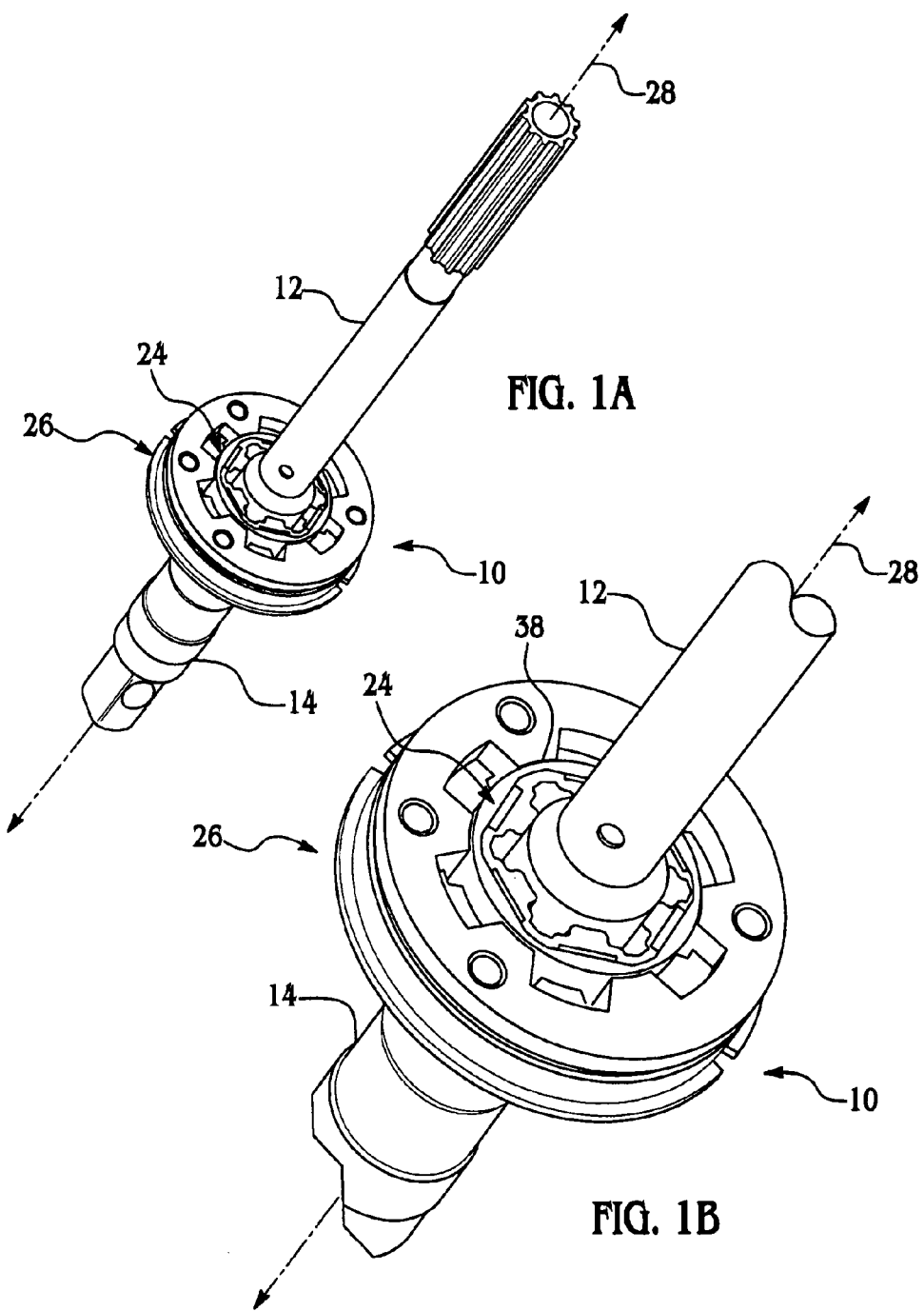

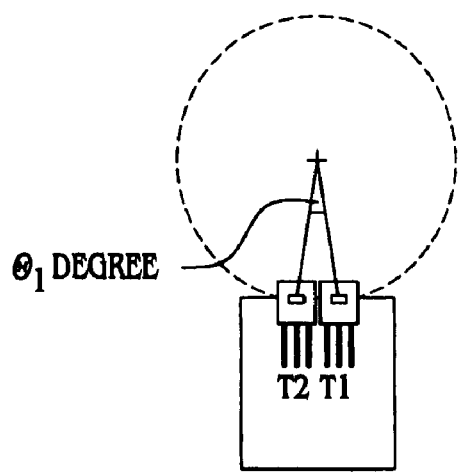
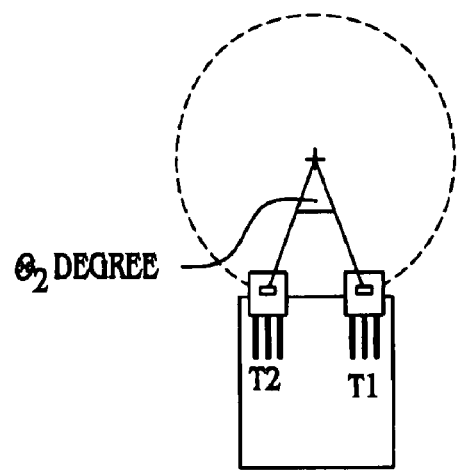
FIG. 3C  FIG. 3D
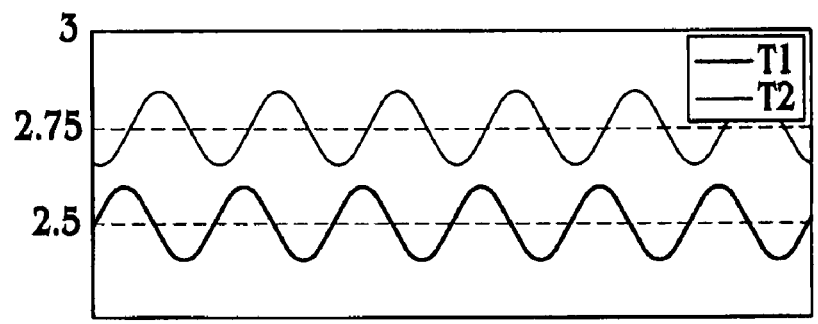
FIG. 3E
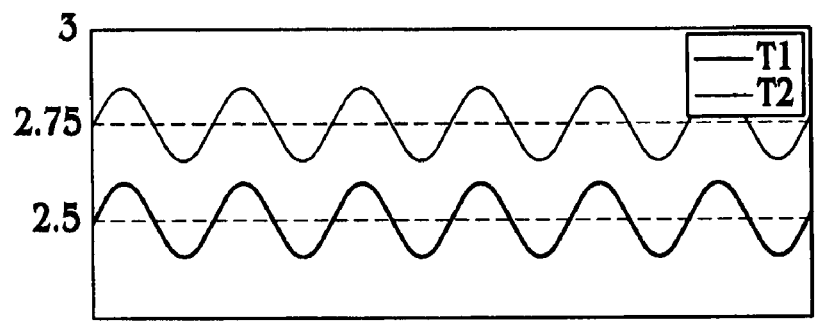
FIG. 3F

APPARATUS FOR SENSING ANGULAR DISPLACEMENT BETWEEN FIRST AND SECOND ROTATING SHAFTS INCLUDING FLUX COLLECTORS

FIELD OF THE INVENTION

The present invention relates generally to apparatus for sensing position and/or torque and more particularly to an apparatus for sensing angular displacement between first and second rotating shafts.

BACKGROUND OF THE INVENTION

It is frequently important to measure or sense an angular displacement and/or relative torque between first and second shafts. The relative displacement may be measured by a small angle displacement sensor. The relative position may then be used to derive the torque applied between the two shafts.

For example, power steering systems in motor vehicles and the like are designed to provide appropriate hydraulic or electrical assist to allow a driver to complete a turn of the motor vehicle. The driver typically turns a steering wheel which is connected to a first shaft. The first shaft is coupled to a second shaft which is connected to a steering mechanism. The first and second shafts may be coupled by a compliant member, such as a torsion bar. Typically, the first shaft may rotate with respect to the second shaft by a predetermined number of degrees, e.g., ±12 degrees. Mechanical stops may prevent further movement. The amount of assist is determined as a function of the amount of torque being applied to the first shaft.

Many types of position sensors utilize one or more magnets for generating a magnetic field. The magnetic circuit typically includes a second magnetic structure which forms a gap. A sensing device, disposed within the gap, detects changes in the magnetic flux which is used as an indication of the relative displacement between the first and second shafts.

One such system is disclosed in US Patent Application 20040011138, published Jan. 22, 2004 (hereafter "Gandel"). The second magnetic structure in Gandel is made up of two ferromagnetic rings, each having a plurality of axially oriented teeth. Each ring includes a circular flux-closing zone, which is parallel to the flux-closing zone of the other ring. The teeth of the rings are generally perpendicular to the flux-closing zones and are interleaved.

One inherent problem with the Gandel device is that it is sensitive to mechanical misalignment during assembly. Specifically, the axial teeth of the rings require very accurate placement with respect to each other. A deviation in the relative position of the rings and teeth with respect to each other will cause reduced performance of the device. It is difficult to accurately align the teeth of the rings and to maintain their relative position to maintain the correct distance from tooth to tooth.

Another disadvantage of the Gandel device is that it is sensitive to mechanical variation during operation. The device is sensitive to angular and parallel changes in the relationship of the two rotors to one another. Mechanical variation in these two directions will cause variation in the output.

Another disadvantage of the Gandel device is an output variation over 360°. This variation is caused by the magnetic structure of the device and the measurement location of the magnetosensitive elements.

Another inherent problem with the rings of the Gandel device is that they are complex and difficult and costly to manufacture.

Another continual concern with such sensors is cost and packaging. Applications for such sensors are continually be re-designed, modified and allotted less physical space. The sensors, thus, must be fit into a smaller space while maintaining required accuracy.

The present invention is aimed at one or more of the problems identified above.

SUMMARY OF THE INVENTION

In a first aspect of the present invention, an apparatus for measuring the relative displacement between a first shaft and a second shaft is provided. The apparatus includes a first rotor assembly, at least one magnet, a second rotor assembly, a flux collector and a sensing device. The first rotor assembly is coupled to the first shaft and is centered on an axis. The at least one magnet has a magnetic field and is disposed on the first rotor assembly. The second rotor assembly is coupled to the second shaft. The first and second rotor assemblies are coaxial. The second rotor assembly has a first stator plate and a second stator plate. The first and second stator plates have a circular base section and a plurality of teeth extending from the base section in a direction radial of the axis. The flux collector arrangement has a first collector and a second collector. The first and second collectors have a curved first surface. The curved first surface of the first and second collectors are spaced from an outer rim of the base section of the first and second stator plates, respectively. The first and second collectors having a second surface. The second surface of the first collector and the second surface of the second collector are parallel and form a gap. The sensing device is disposed within the gap for sensing a magnetic flux of the magnetic field.

In a second of the present invention, an apparatus for measuring the relative displacement between a first shaft and a second shaft is provided. The apparatus includes a first and second rotor assemblies, a plurality of magnets, a second rotor assembly, a flux collector arrangement, and a sensing device. The first rotor assembly is coupled to the first shaft and is centered on an axis. The first rotor assembly has a circumference and a plurality of slots or flats spaced evenly around the circumference. The plurality of magnets have a magnetic field and are disposed on a respective slot or flat of the first rotor assembly. The second rotor assembly is coupled to the second shaft. The first and second rotor assemblies are coaxial. The second rotor assembly has a first stator plate and a second stator plate. The first and second stator plates have a circular base section and a plurality of teeth extending from the base section in a direction radial of the axis. The flux collector arrangement has a first collector and a second collector. The first and second collectors have a curved first surface spaced from an outer rim of the base section of the first and second stator plates, respectively. The first and second collectors have a tooth portion with a second surface and extend from the respective base section, the second surface of the tooth portion of the first collector and the second surface of the tooth portion of the second collector are parallel and form a gap. The sensing device is disposed within the gap for sensing a magnetic flux of the magnetic field.

BRIEF DESCRIPTION OF THE DRAWINGS

Other advantages of the present invention will be readily appreciated as the same becomes better understood by reference to the following detailed description when considered in connection with the accompanying drawings wherein:

FIG. 1A is an illustration of an apparatus for sensing a relative position between a first shaft and a second shaft, according to an embodiment of the present invention;

FIG. 1B is an enlarged illustration of the position sensing apparatus of FIG. 1A;

FIG. 3C is a diagrammatic illustration of a position sensor with two sensing devices, according to an embodiment of the present invention;

FIG. 3D is a diagrammatic illustration of a position sensor with two sensing devices, according to an embodiment of the present invention;

FIG. 3E is an exemplary graph illustrating operation of the position sensor of FIG. 3C;

FIG. 3F is an exemplary graph illustrating operation of the position sensor of FIG. 3D;

DETAILED DESCRIPTION OF THE INVENTION

Figure 1C:
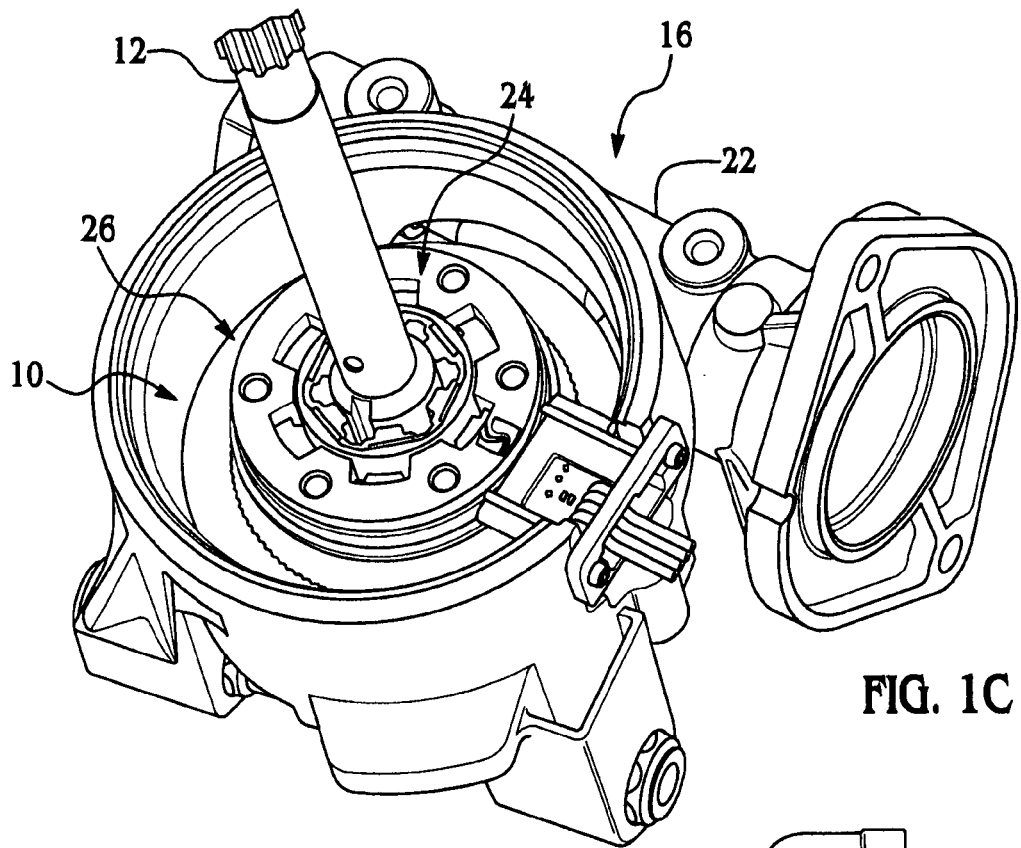
FIG. 1C is a three-dimensional illustration of the position sensing apparatus of FIG. 1A in a housing.

With reference to the Figures and in operation, an apparatus 10 senses the relative position between a first shaft 12 and a second shaft 14. The relative position may then be used to derive the torque applied between the first and second shafts 12,14.

In the illustrated embodiment, the apparatus 10 may be used in an power steering system 16 to provide a measurement of input torque generated by a driver turning a steering wheel (not shown). The input torque is used to provide appropriate hydraulic or electrical assist to allow the driver to complete a turn with minimal effort, but increased stability. The first shaft 12 is connected to the steering wheel. The second shaft 14 is coupled to a steering system (not shown), for example, as a rack and pinion gear mechanism. As is known in the art, a compliant member such as a torsion bar 18 couples the first and second shafts 12,14. The first and second shafts 12,14 are moveable relative to each other through a predetermined range, e.g., ±8 or ±12 degrees. It should be noted that the range of relative movement will be dependent upon application. The present invention is not limited to any given range of relative movement.

Mechanical stops 20 restrict further relative movement between the first and second shafts 12,14. A position sensor may be used to measure rotation of the first or second shafts 12,14. The position sensor may be a contact or non-contact sensor. The apparatus 10 may contained within a housing 22, which may also contain portions of the first and second shafts 12,14 and components of the power steering system. Such steering systems 16 are well known in the art and are, therefore, not further discussed.

In one aspect of the present invention, the apparatus 10 includes a first rotor assembly 24 and a second rotor assembly 26. The first rotor assembly 24 is coupled to the first shaft 12 and is centered on an axis 28. The second rotor assembly 26 is coupled to the second shaft 14. The first and second rotor assemblies 24,26 are coaxial.

In another aspect of the present invention, the apparatus 10 includes a flux collector apparatus 110 (see FIGS. 9 through 22) which is composed, at least partially, of steel or laminated steel. The flux collector apparatus 110 allows the sensor 10 to be more compact, reducing the size of, and/or the amount of material contained in, the other components.

With specific reference to FIGS. 2A, 2B, 7A, 7B, 7C, 13 and 14 the first rotor assembly 24 includes a rotor 30 centered on the axis 28. In one embodiment, the rotor 30 includes a plurality of slots or flats 32. The first rotor assembly 24 includes a plurality of magnets 34 located in each slot or flat 32.

The magnets 34 may be affixed or held in place in any appropriate manner such as by an adhesive or crimping. In one aspect of the present invention, a retaining member 36 may be used along with, or in place of, the adhesive. The retaining member 36 is made from a non-magnetic material, such as plastic. In one embodiment, the retaining member 36 is overmolded the combined rotor 30 and magnets 34, once the magnets 34 are inserted into the slots or flats 32.

Figure 13:
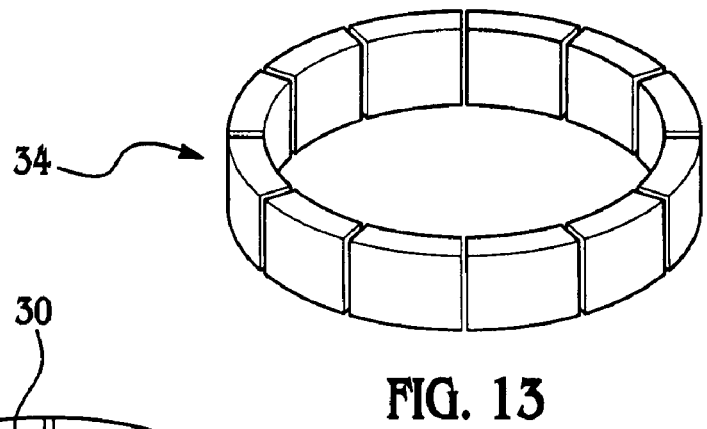
FIG. 13 is a diagrammatic illustration of a first rotor arrangement of an apparatus for sensing a relative position between a first shaft and a second shaft, according to an embodiment of the present invention.
Figure 14:
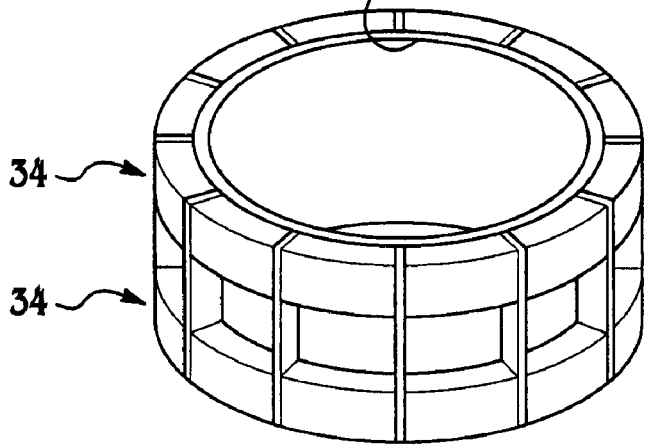
FIG. 14 is a diagrammatic illustration of a first rotor arrangement of an apparatus for sensing a relative position between a first shaft and a second shaft, according to another embodiment of the present invention.
Figure 15:
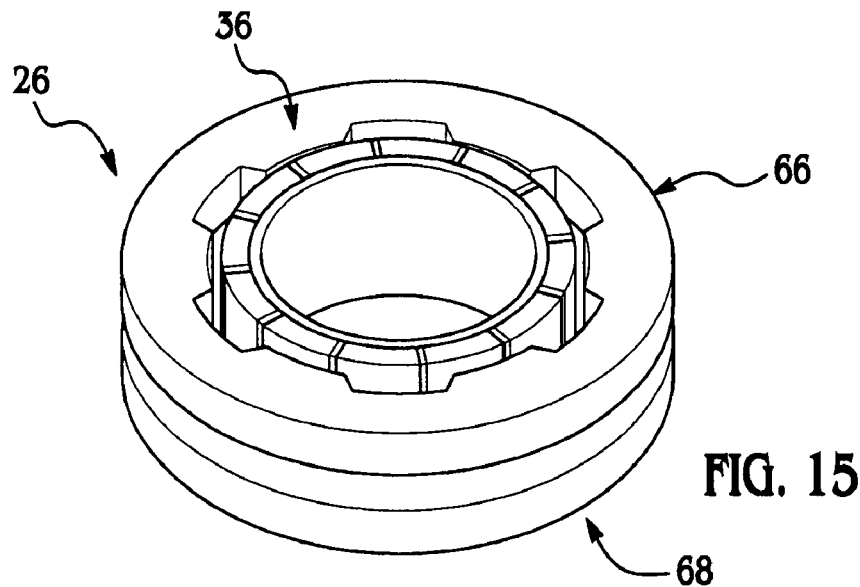
FIG. 15 is a diagrammatic illustration of an apparatus for sensing a relative position between a first shaft and a second shaft, according to an embodiment of the present invention.
Figure 16:
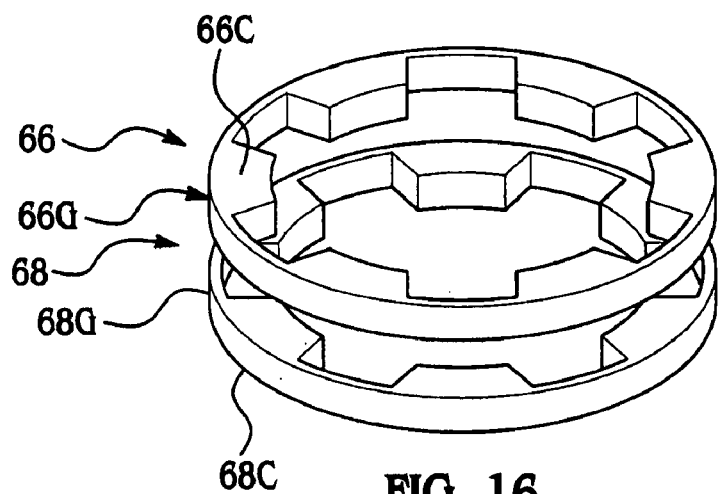
FIG. 16 is a diagrammatic illustration of a second rotor assembly of the apparatus of FIG. 15.
Figure 17:
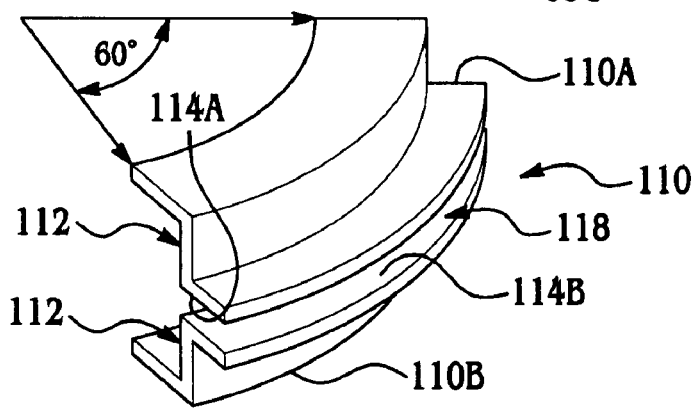
FIG. 17 is a diagrammatic illustration of an Z-shaped flux collector, according to an embodiment of the present invention.

In one embodiment, the magnets may be arranged in a single ring around the rotor 30 (see FIG. 13). In another embodiments, the magnets may be arranged in multiple rings, e.g., dual rings, around the rotor 30.

Figure 2A:
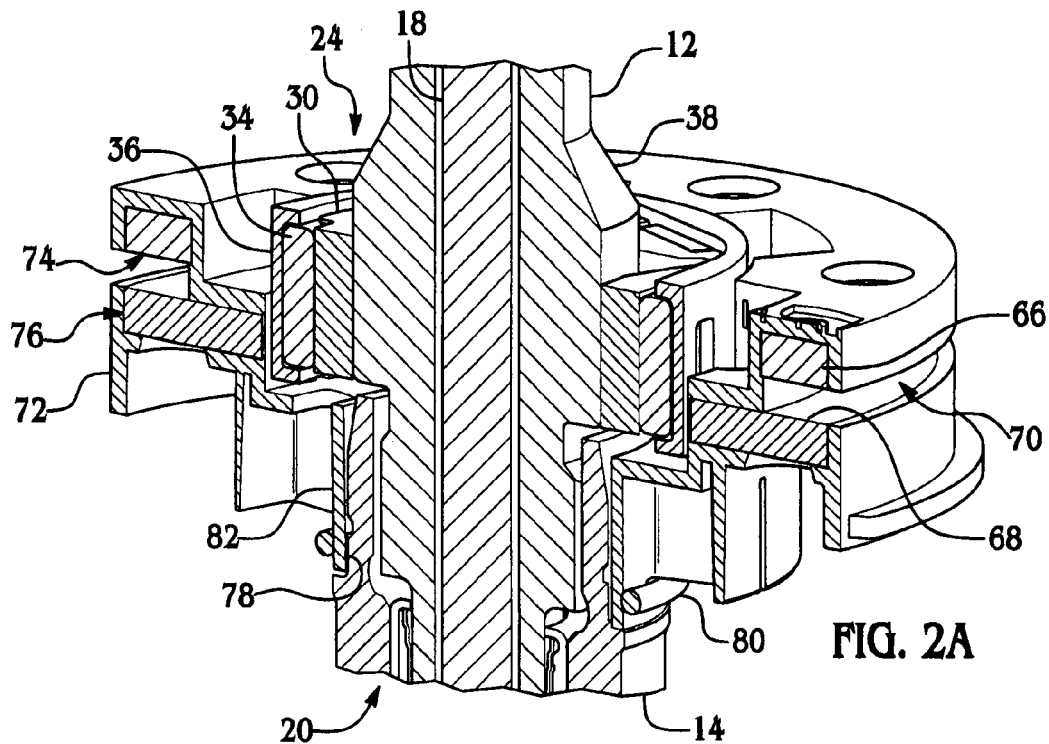
FIG. 2A is a first cut away view of the apparatus of FIG. 1A.
Figure 2B:
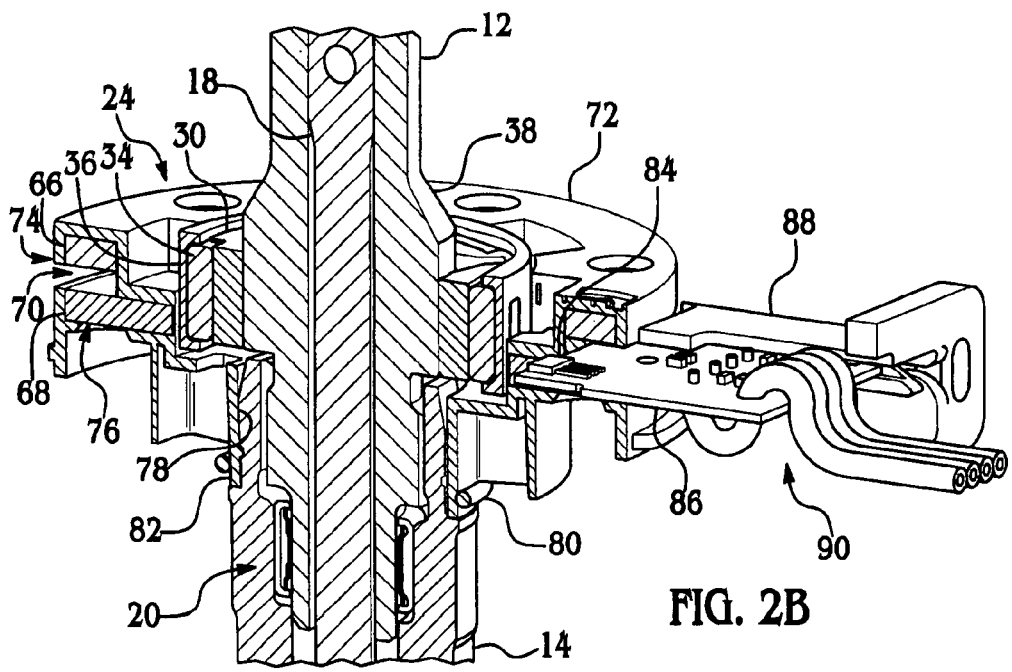
FIG. 2B is a second cut away view of the apparatus of FIG. 1A.
Figure 2C:
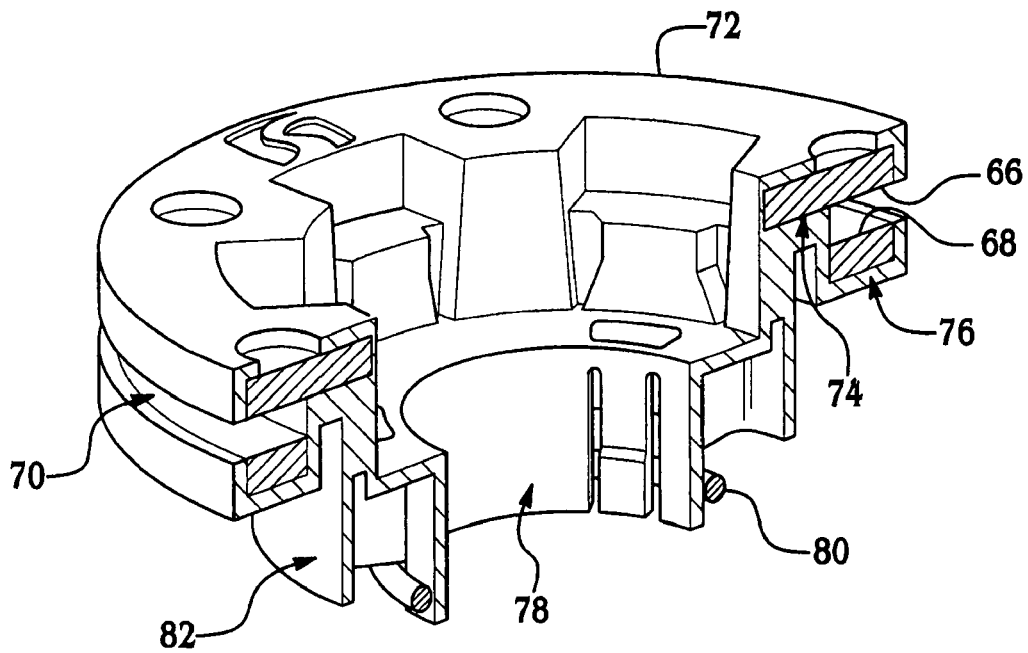
FIG. 2C is a cut away view of a portion of a rotor assembly of the apparatus of FIG. 1A.
Figure 2D:
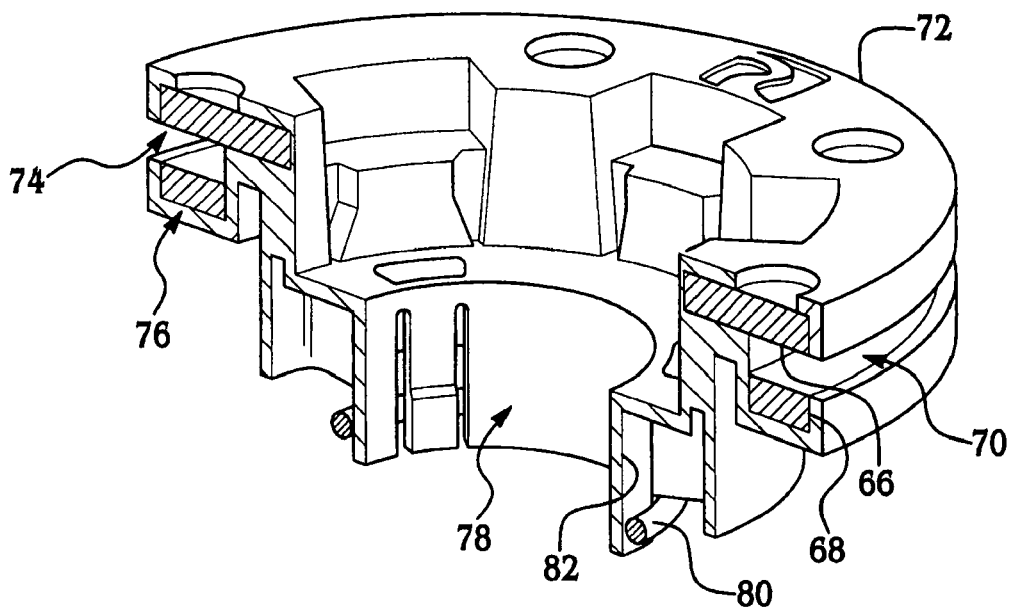
FIG. 2D is a second cut away view of a portion of a rotor assembly of the apparatus of FIG. 1A.

With specific reference to FIGS. 2A and 2B, the first rotor assembly 24 is pressed onto the first shaft 12. As shown, the first shaft 12 may have an enlarged portion 38 which forms a press-fit with the first rotor assembly 24.

The first rotor 30 is composed of a soft magnetic material, such as a nickel iron alloy. The first rotor 30 may be made using a stamping process or may be made from a powdered metal using a sintering process or through a machining process.

The rotor 30 includes an inner surface 40 and an outer surface 42. The slots or flats 32 are formed in the outer surface 42. The inner surface 40 has an associated inner radius 44 and the outer surface 42 has an associated outer radius 46. In between the slots or flats 32, the rotor 30 forms support structures 48. The inner radius 44 is defined by the inner surface 40 at the center of a support structure 48. In one aspect of the present invention, the inner radius 44 is greater than outer radius 46.

In the illustrated embodiment, the magnets 34 are disposed evenly around the circumference of the rotor 30. The spacing between, i.e., the width of the support structures 48, the magnets 34 are approximately the width of the magnets 34 or slots or flats 32. The support structures 48 serves as the path the magnetic flux flows through to complete the magnetic circuit on its path through the magnets 34.

As shown, in the illustrated embodiment, top surface of the magnets 34 does not protrude beyond the support structures 48 in the axial direction.

In one embodiment, the rotor assembly 24 includes six square magnets 34, such as shown in FIG. 12A. The front surface of the magnet 34 in FIG. 12A is square. In an alternative embodiment, the front surface of the magnet 34 is rectangular.

The front surface of the magnet 34 in FIG. 12A is the North pole of the magnet 34. The back surface of the magnet 34 is the South pole. In the illustrated embodiment i.e., one of the front or back surface of the magnet 34 is adjacent the rotor 30. Four side surfaces adjoin the front and back surfaces of the magnets 34. At least one pair of edges formed by one of the front and back surfaces and the four side surfaces of the magnets 34 are rounded.

In one embodiment, all of the magnets 34 on the rotor are orientated in a similar manner, i.e., one of the North pole or the South pole is "down", i.e., adjacent the rotor 30, and the other pole, is "up". In another embodiment, the orientations of the magnets 34 are alternated, one magnet 34 is orientated "up" and the adjacent magnets 34 are orientated "down".

The first rotor assembly 24 may also include other magnet arrangements. For example, with reference to FIG. 12B, the rotor assembly 24 may include two adjacent rows 50,52 of magnets 34. Each row 50,52 may include a plurality of magnets 34 spaced equidistantly around the circumference of the rotor 30. Each magnet 34 in one of the rows 50,52 may be orientated in the same direction or orientated in the opposite direction from the adjacent magnets. Alternatively, the rotor assembly 24 may include one or more ring magnets 54, as shown in FIG. 12C. The ring magnet 54 has one or more pairs of adjacent poles 56, i.e., each pair having a North pole and a South pole. The North pole of one pair being adjacent the South pole of the next pair. For example, the ring magnet 54 may have six pairs of North and South poles. The ring magnet 54 has an interior bore 58 which may surround the rotor 34. The ring magnet 54 may be affixed to the rotor 34 by an adhesive and/or the retaining member 36 and/or any suitable means. If more than one ring magnet 54 is provided, the ring magnets 54 are parallel.

The rotor 34 is designed to eliminate hoop stress. Hoop stress is eliminated by the relationship between the inner radius 44 and the outer radius 46. As shown, the rotor 34 has no sharp corners which will reduce wear on any manufacturing tools. In the illustrated embodiment, each magnet slot or flat 32 is defined by a plane 60. A centerpoint 62 of the plane 60 is tangent to the outer radius 46. Associated with each slot or flat 32 may also include stress relief slots 64. Additionally, a non-continuous inner diameter 47 may also eliminate hoop stress.

Figure 4:
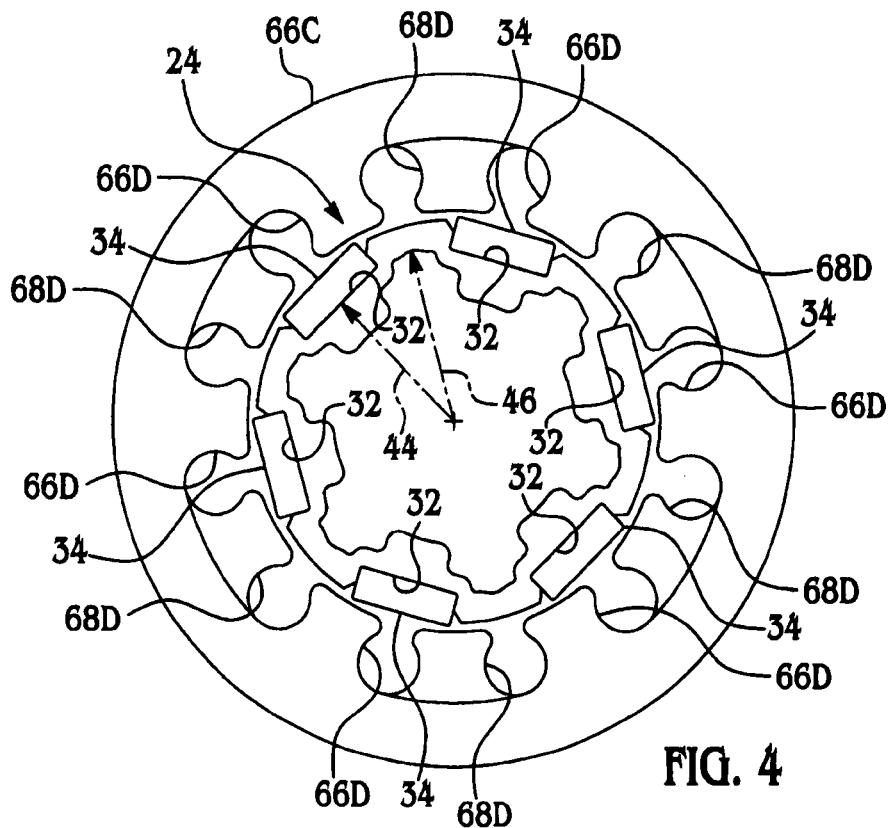
FIG. 4 is a top view of the first and second rotor assemblies of FIG. 3A.
Figure 5:
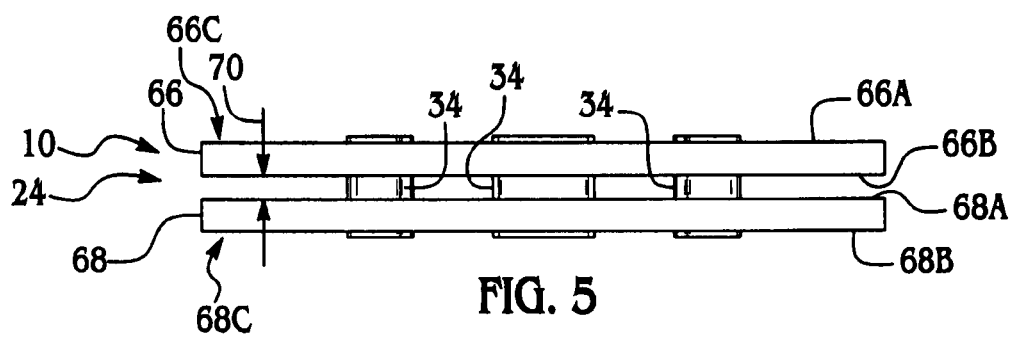
FIG. 5 is a side view of the first and second rotor assemblies of FIG. 3A.

Returning to FIGS. 2A, 2B, 3A, 4, 5, 15 and 16 the second rotor assembly 26 includes a first stator plate 66 and a second stator plate 68. The first and second stator plates 66,68 are parallel to each other. As best shown in FIG. 5, the first stator plate 66 includes an upper surface 66A and a lower surface 66B. The second stator plate 68 also includes an upper surface 68A and a lower surface 68B. The upper and lower surfaces 66A, 66B,68A, 68B are parallel. The lower surface 66B of the first stator plate 66 faces the upper surface 68A of the second stator plate 68, as shown. The first and second stator plates 66,68 may be manufactured using a stamping process may be made from a powdered metal using a sintering process, or may be made using a machining process.

Figure 3A:
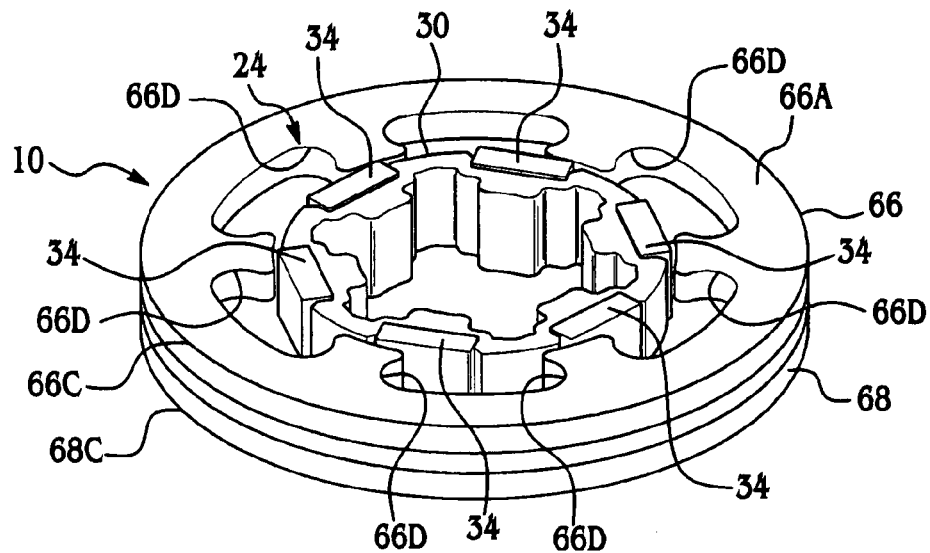
FIG. 3A is a three-dimensional view of a portion of a first and second rotor assembly of the apparatus of FIG. 1A.

As best shown in FIGS. 3A and 5, in the illustrated embodiment the first stator plate 66 includes a circular base 66C and a plurality of teeth 66D extending from the circular base 66C in a radial direction. Likewise, the second stator plate 68 includes a circular base 68C and a plurality of teeth 68D extending from the circular base 68C in a radial direction.

As discussed below, the teeth 66D,68D of the first and second stator plates 66,68 may be in-phase or offset from each other.

In the illustrated embodiment, the first and second plates 66,68 are planar. As shown in FIGS. 3A and 5 the upper surface of the teeth 66D,68D is co-planar with the upper surface 66A,68A of the respective stator plate 66,68 and the lower surface of the teeth 66D,68D is co-planar with the lower surface 66B,68B of the respective stator plate 66,68. In other words, the teeth 66D on the first stator plate 66 do not axially intersect with the teeth 68D on the second stator plate 68, i.e., do not intersect with a common plane perpendicular to the axis 28.

As shown in FIG. 5, the first and second stator plates 66,68 form a gap 70 between the lower surface 66B of the first stator plate 66 and the upper surface 68A of the second stator plate 68. As shown, the gap 70 has a uniform thickness.

With specific reference to FIGS. 2A, 2B, 2C, 2D, in one aspect of the present invention, the second rotor assembly 26 includes a retaining member 72. The retaining member 72 is made form a non-magnetic material, such as plastic. In one embodiment, the retaining member 72 is overmolded the first and second stator plates 66,68. The first stator plate 66 and the second stator plate 68 are retained by the retaining member 72 which fixes the relative position thereof. The retaining member 72 retains the first and second stator plates 66,68 in a predetermined relationship, i.e., to maintain the size of the desired gap 70 and the angular relationship between the first and second stator plates 66,68.

The retaining member 72 also includes an inner bore 78. The retaining member 72 is slipped over the second shaft 14, the inner bore 78 forming a friction fit with the second shaft 14. The second shaft 14 may also include a number of splines (not shown) which form a spline interface with the retaining member 72. A retaining ring 80 fitted over an outer surface 82 of the retaining member 74 opposite the inner bore 78 may be used also as a redundant feature to retain the retaining member 72 on the second shaft 14.

Figure 1D:
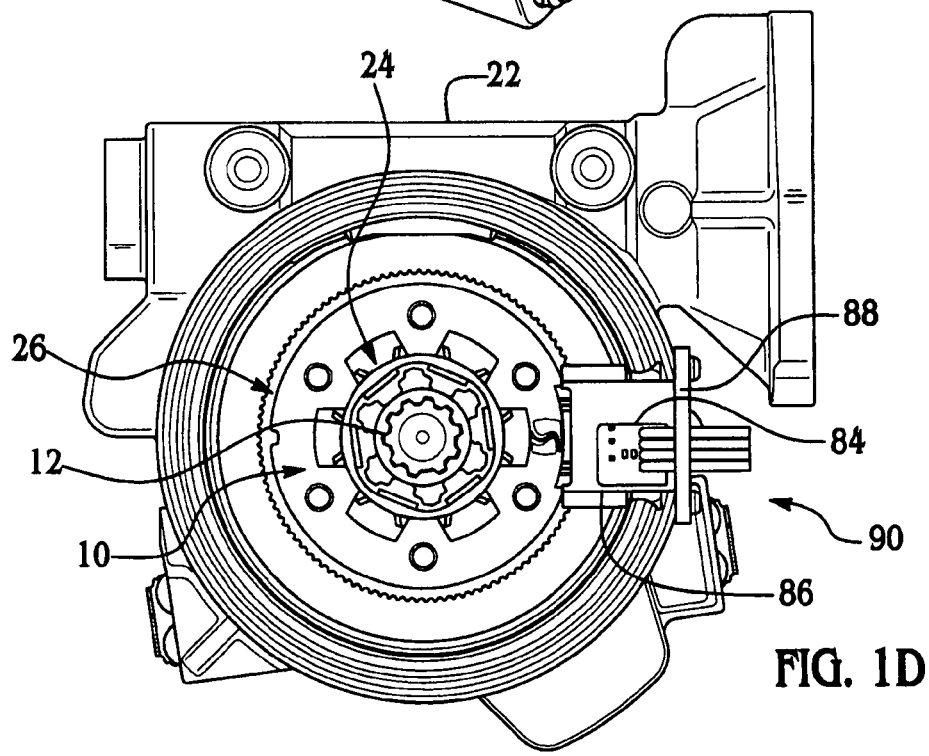
FIG. 1D is a top view of the apparatus and housing of FIG. 1C.

With particular reference to FIGS. 1C, 1D, and 2B, the apparatus 10 includes at least one sensing device 84 disposed within the gap 70 for sensing a change in magnetic flux. In the illustrated embodiment, the sensing device 84, e.g., a hall effect sensor, is mounted to a circuit board 86. The sensing device 84 and the circuit board 86 are contained with a probe housing 88. The probe housing 88 is either mounted to a stationery member (not shown) or rotationally mounted to a bearing surface (not shown) and serves to accurately position the sensing device 84 within the gap 70. A wire harness 90 provides power and delivers signals from the sensing device 84. Alternately or additionally, a wedge gage plate, or screws may be used to assist in accurately positioning the sensing device 84 in the gap 70.

As discussed above, in the illustrated embodiment, the teeth 66D,68D of the first and second stator plates 66,68 are offset or out-phase. The magnetic field measured by the sensing device 84 varies depending on the alignment of the magnets in the first rotor assembly 24 and the teeth 68D,68D. As shown in FIG. 4, the radial gap between the teeth 66D,68D and the top of the magnets 34 is greater than the gap between the teeth 66D,68D and the top of the supporting structures 48.

Figure 6:
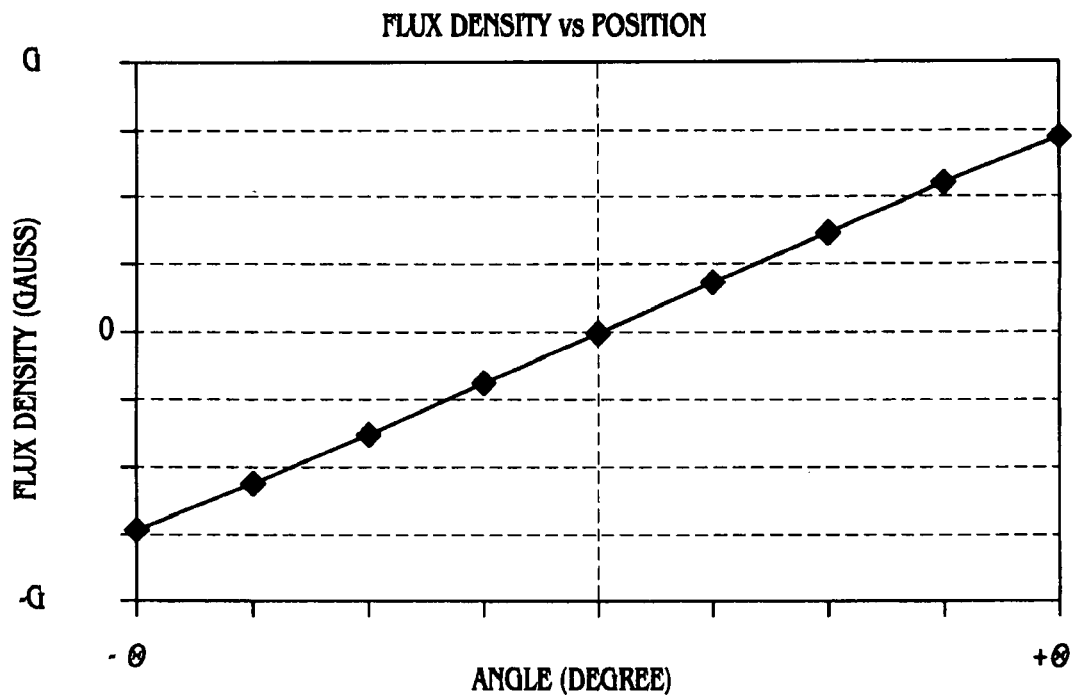
FIG. 6 is an exemplary graph illustrating angle versus flux density of the apparatus of FIG. 1A.
Figure 7A:
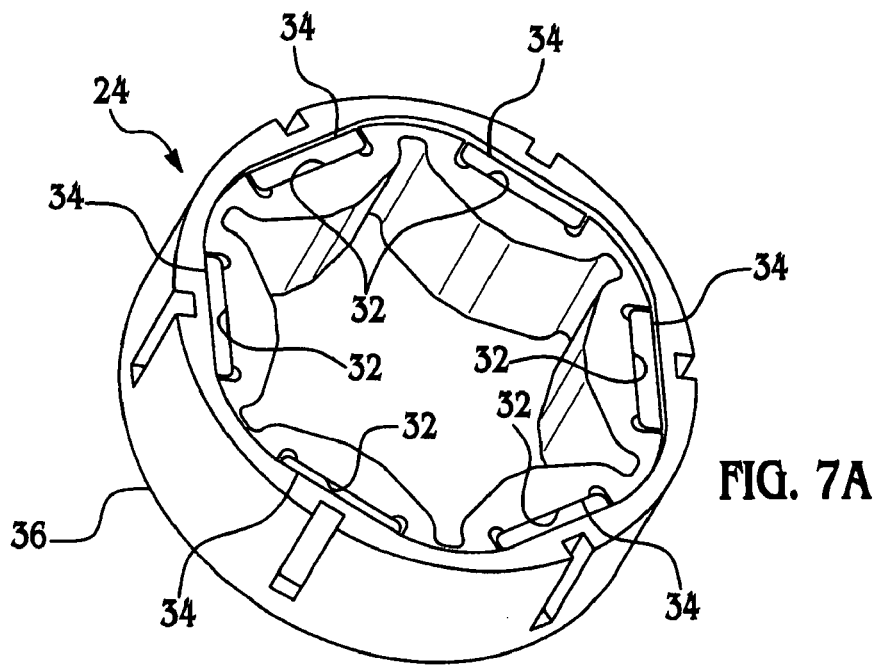
FIG. 7A is a three-dimensional illustration of a first rotor assembly of the apparatus of FIG. 1A, according to an embodiment of the present invention.
Figure 7B:
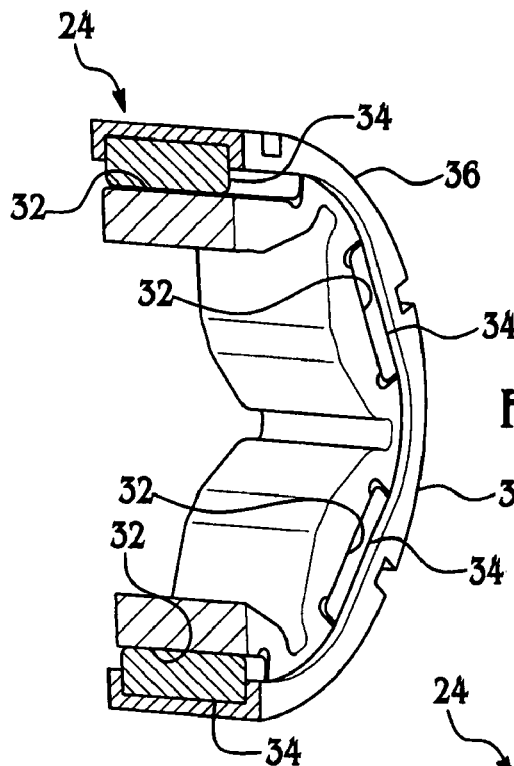
FIG. 7B is a cut away view of the first rotor assembly FIG. 7A.
Figure 7C:
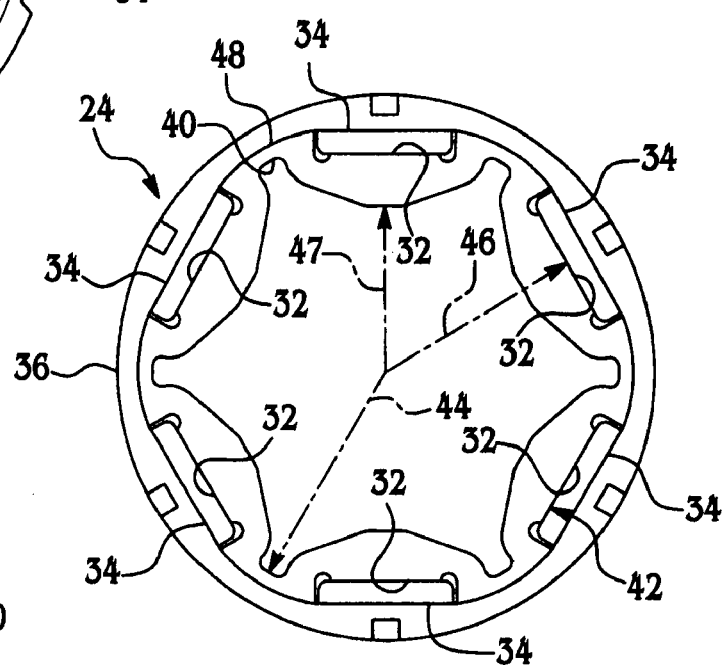
FIG. 7C is a side view of the first rotor assembly of FIG. 7A.
Figure 7D:
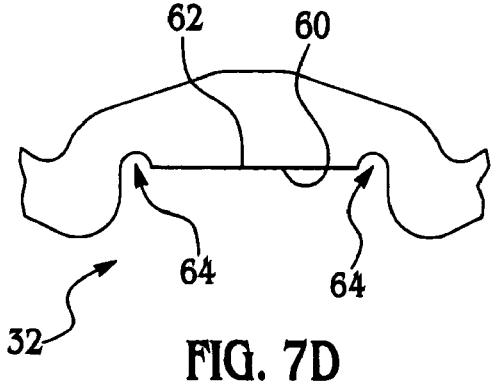
FIG. 7D is a diagrammatic illustration of a portion of a rotor of the first rotor assembly of FIG. 7A.

The magnetic circuit formed by the magnets has mainly two regions called upper magnetic zone formed between upper stator and the magnets and lower magnetic zone formed between lower stator and the magnets. The differential flux between these two zones flows through the measurement slot where magnetosensitive elements sense the field. Hence at no load torque condition, both of the zones produce the same amount of flux, hence the differential flux crossing through the gap 70 is zero. Depending on the relative displacement (±8 degrees) the differential flux either flows up or down in the measurement slot. With reference to FIG. 6, an exemplary graph of flux density measured by the sensing device 84 as a function of angular displacement between the first and second shafts 12, 14 is shown. At zero degrees, no torque is being on the first shaft 12 and no flux is measured. As torque is applied to the first shaft 12, the flux density measured by the sensing device 84 increases or decreases depending on the direction of travel of the first shaft 12. As shown in the example of FIG. 6, the maximum relative displacement between the first and second shafts 12, 14 is ±θ degrees with an associated −/−G Gauss of flux density variation. It should be noted that the graph of FIG. 6 is exemplary and for illustrative purposes only.

With particular reference to FIGS. 3C, 3D, 3E, and 3F, two sensing devices 84 may be used. Any changes in magnetic flux at constant displacement between the first and second rotor assemblies 24,26 over 360 degrees will have the same effect on each device 84. The spacing of the sensing devices 84 is dependent upon the number of magnetic poles and teeth of the first and second rotor assemblies 84, respectively. In the illustrated embodiment, there are six magnets associated with the first rotor assembly 24 and six radial teeth in each stator in the second rotor assembly 26. Due to this particular magnetic structure, at constant torque conditions, the differential flux in the measurement zone will vary over 360 degrees. This variation will cause an oscillation of the output over 360 degrees which will appear with a frequency equal to the number of magnetic poles and stator teeth located on the first and second rotor assemblies. As shown in FIG. 3C, two sensing devices 84 may be used. In the present embodiment, this oscillation will have a 6th order ripple and will be referred to as a "6 per rev". This six per rev will appear in the signal from both sensing devices 84 (T1 and T2). In this case, the T1 and T2 signals have opposite polarities. The black rectangle inside the Hall sensors 84 represents the sensitive area of the device. The output signals are proportional to the normal component of the flux passing through the sensitive area. It is desirable that the oscillation affects the T1 and T2 signals in the same manner at the same time. Because of this, the Hall sensors should be separated such that the oscillations in T1 and T2 remain in phase (since they are inverted to each other). By placing the oscillations of the T1 and T2 signals in phase, the ripple effect in the calculated torque signal is minimized. Due to mechanical packaging limitations with regard to the locations of the sensitive areas of the two Hall sensors with respect to each other, a certain phase shift exists between T1 and T2. This phase shift is shown in FIG. 3C as $\theta_1$. FIG. 3E illustrates the T1 and T2 signals over 360 degrees with no compensation. In this particular embodiment our goal is to minimize the oscillation in the calculated torque signal. By placing the two Hall probes 30 degrees apart shown as $\theta_2$ in FIG. 3D, we can put the signals in phase to minimize the output oscillation calculated in the torque measurement. FIG. 3D shows the implementation of this concept in the torque sensor. R is denoting the radial location of the Hall sensors from the axis of the shaft. FIG. 3F illustrates the T1 and T2 signals after appropriately spacing the hall probes to minimize the ripple in the calculated torque signal.

Figure 3B:
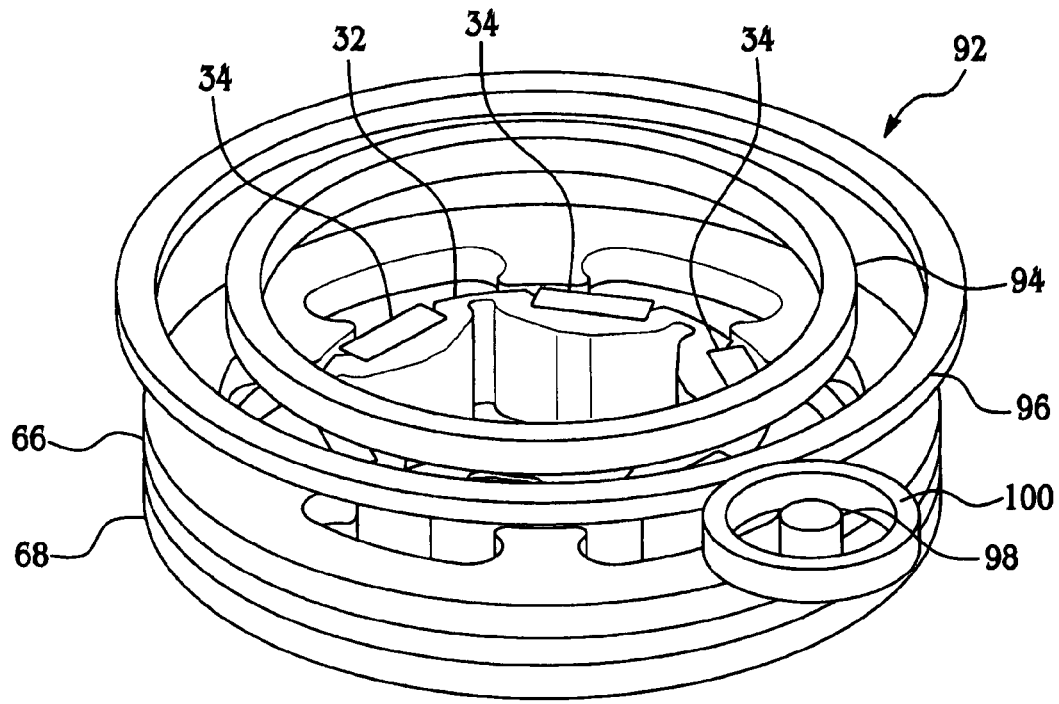
FIG. 3B is a diagrammatic illustration of a position sensor and the apparatus of FIG. 1A.

With particular reference to FIG. 3B, in another aspect of the present invention, a non-contacting position sensor 92 may be used with the apparatus 10 for sensing the relative and/or absolute position of the first shaft 12 and the second shaft 14. The position sensor 92, which is shown diagrammatically, includes a ring magnet 94 magnetized diametrically resulting in two-pole (N-S) configuration. The ring magnet 94 and the ring shield 96 are concentric with the second shaft 12 and rotate therewith. The relative sensor section can detect 0~360 degrees in either direction of rotation. A disk magnet 98 magnetized through the diameter and a ring shield 10, which are external to the ring shield 96 and fixed relative to the first shaft. The disk magnet is used to provide absolute position of the shaft since the shaft can rotate ±810 degrees. The turns counter section of the sensor rotates in steps of 180 degrees revolution of the first shaft or the relative sensor section and connected there by Geneva wheel gear mechanism. In both sensor section there are two Hall sensors placed at quadrature. They both use sine and cosine signals to extract position information.

The teeth 66D,68D may have different shapes. Various examples of teeth 66D,68D are shown in FIGS. 8A, 8B, 8C, 8D. However, it should be noted that the present invention is not limited to any one shape of the teeth 66D,68D.

As discussed above, the teeth 66D,68D may be in phase or out of phase. If the teeth 66D,68D are in-phase or aligned, a centerline 104 of the teeth 66D of the first stator plate 66 is aligned with a centerline 104 of the teeth 68D of the second stator plate 68. If the teeth 66D,68D are out-of phase, than the centerline 104 of the teeth 66D of the first stator plate 66 are offset from the centerline 104 of the teeth 68D of the second stator plate 68, as shown in FIGS. 3A and 4.

If the teeth 66D,68D are out-of-phase, there may be a radial gap between edges of the teeth 66D,68D as shown best in FIG. 4, the edges of the teeth 66D,68D may be aligned, or the teeth 66D,68D may at least partially overlap.

Figure 8A:
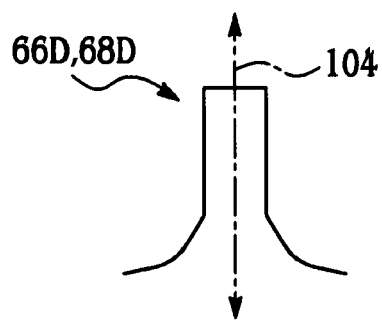
FIG. 8A is an illustration of a tooth of the second rotor assembly according to an embodiment of the present invention.
Figure 8B:
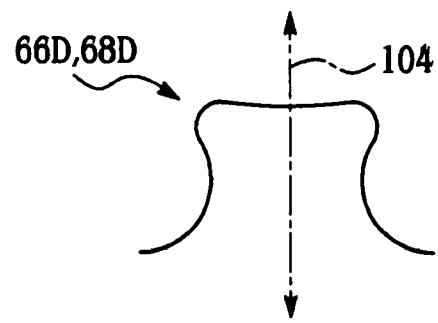
FIG. 8B is an illustration of a tooth of the second rotor assembly according to another embodiment of the present invention.
Figure 8C:
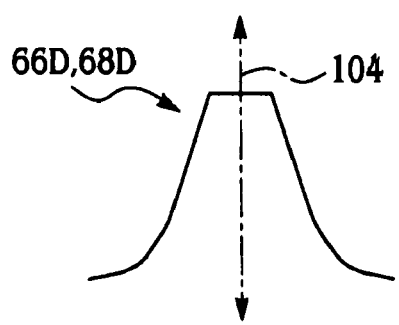
FIG. 8C is an illustration of a tooth of the second rotor assembly according to a further embodiment of the present invention.
Figure 8D:
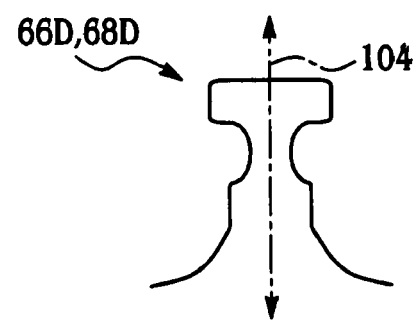
FIG. 8D is an illustration of a tooth of the second rotor assembly according to still another embodiment of the present invention.

For example, in one embodiment the edges of the teeth 66D,68D of one of the first and second stator plates 66,68 are adjacent with an edge of one of the teeth 66D,68D of the other of the first and second plates 66,68. The shape of the teeth 66D,68D is shown in FIG. 8C.

In another embodiment, at least a portion of the edge of one of the teeth 66D,68D of one of the first and second plates and at least a portion of the edge of one of the teeth 66D,68D of the other of the first and second plates 66,68 overlap.

With particular reference to FIGS. 9 through 22, in another aspect of the present invention, the flux collector apparatus 110 may have various shapes and/or sizes. In one aspect of the present invention, the flux collector apparatus 110 includes a first collector 110A and a second collector 110B. FIGS. 9-12 and 17-22 illustrate different potential geometric shapes (includes sizes) of the first and second collectors 110A,110B. Each flux collector 110A,110B has a curved surface (best shown in FIGS. 10 and 17) 112. Each curved surface 112 is spaced from an outer rim 66G,68G of the base 66C,68C of the respective first and second stator plate 66,68. The first and second collectors 110A,110B each have a second surface 114A,114B, spaced from one another, forming a gap 118. In one aspect of the present invention, the sensing device 102 is disposed within the gap 118.

Figure 9:
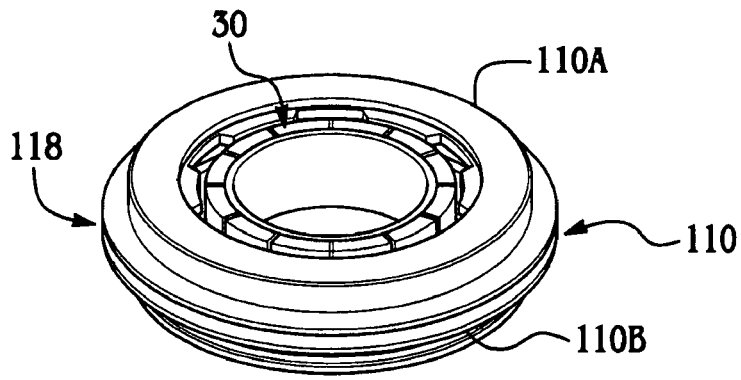
FIG. 9 is a diagrammatic illustration of an apparatus for sensing a relative position between a first shaft and a second shaft having a Z-shaped flux collector apparatus, according to an embodiment of the present invention.

With particular reference to FIG. 9, in one aspect, the first and second collectors 110A,110B are circular and surround, i.e., 360 degrees, the outer rim of the respective stator plate 66,68. The first and second collectors 110A,110B may have various cross-sectional shapes (see below).

In another embodiment, the first and second collectors 110A,110B surround less than 100% of the outer rim of the respective stator plate 66,68 (<360%) (see for example, FIGS. 10-12, 17, 19-22. For example, the first and second collectors 110A,110B may cover ⅙, i.e., 60 degrees, of the outer circumference of each stator plate 66,68. In one aspect of the present invention, the size of the partial collector, i.e., the angular portion of the circumference covered by the collectors 110A,110B may be dependent upon the number of slots/poles of the apparatus 10.

Figure 18:
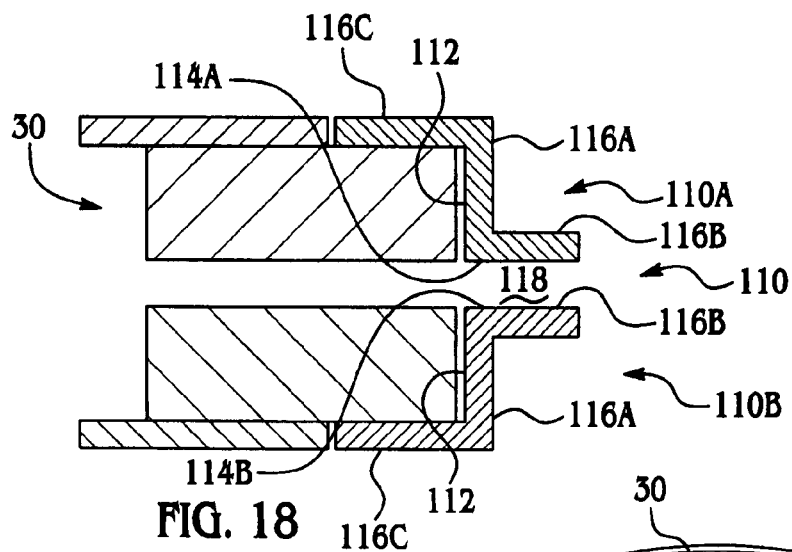
FIG. 18 is a cross-sectional view of the flux collector of FIG. 17.
Figure 19:
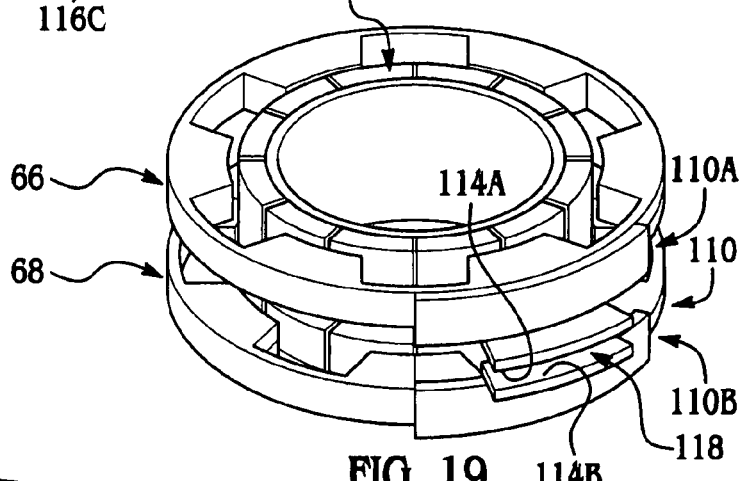
FIG. 19 is a diagrammatic illustration of an L-shaped flux collector, according to another embodiment of the present invention.
Figure 20:
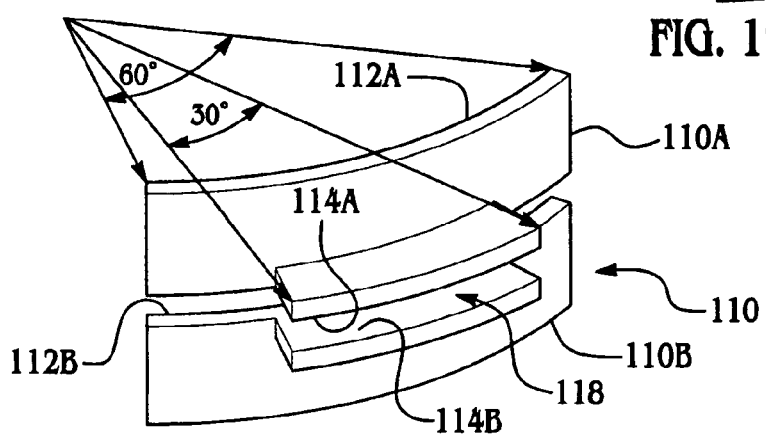
FIG. 20 is a second diagrammatic illustration of the L-shaped flux collector of FIG. 19.

With reference to FIGS. 9, 10, 17 and 18, the first and second collectors 110A,110B may have an L-shaped cross section. The first and second collectors 110A,110B each have a base section 116A, a tooth extension 116B and a side section 116C (as shown in FIG. 18). The curved surface 112 is formed by the respective base section 116A and the second surface is formed by the respective tooth section 116B.

With specific reference to FIG. 9, each collectors 110A, 110B is circular, surrounding or enclosing 360 degrees of the respective stator plate 66,68.

Figure 10:
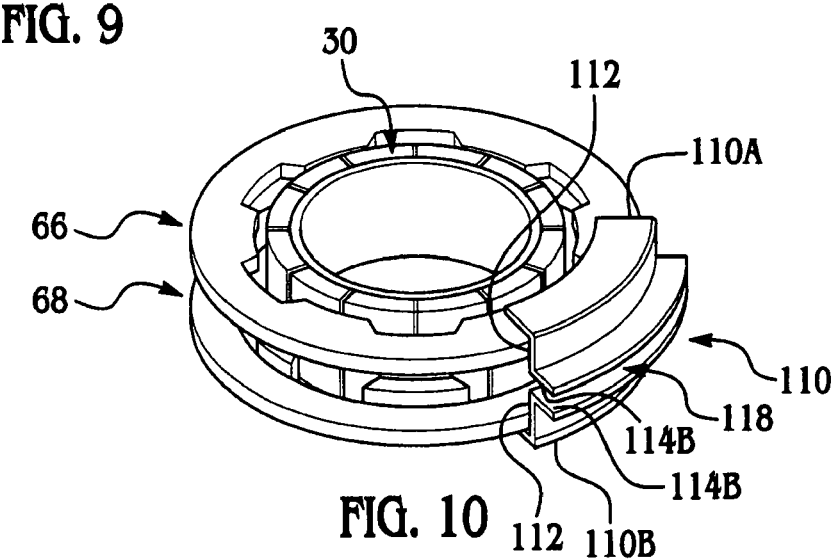
FIG. 10 is a diagrammatic illustration of an apparatus for sensing a relative position between a first shaft and a second shaft having a Z-shaped flux collector apparatus, according to another embodiment of the present invention.

With specific reference to FIG. 10, each collector 110A, 110B may cover only a portion, e.g., 60 degrees, of the respective stator plate 66,68. It should be noted that in the illustrated embodiment the base section 116A, tooth extension 116B, and side section 116C all cover the same portion (in degrees) of the respective stator plate 66,68. However, it should also be noted that the tooth extension 116B may cover more or less of the respective stator plate 66,68. For example, the base section 116A may cover 60 degrees and the tooth extension may cover 30 degrees (see for example, FIGS. 11, 12, and 20).

Figure 11:
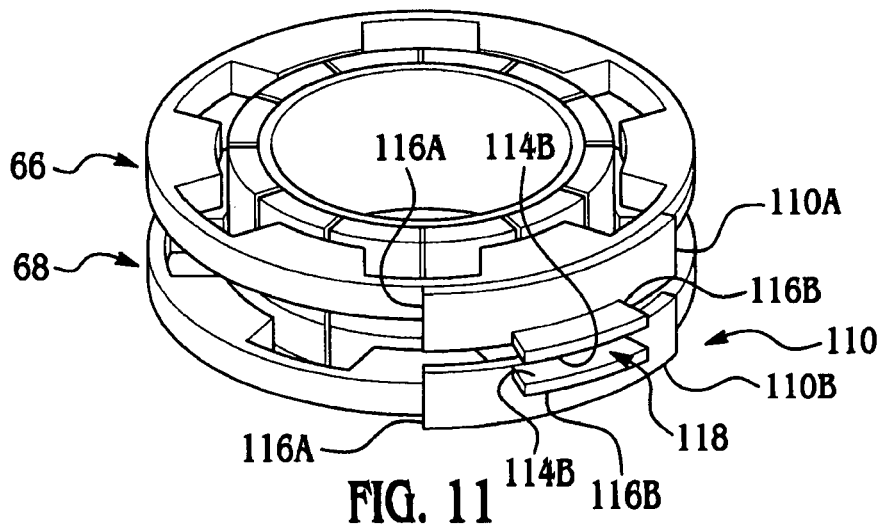
FIG. 11 is a diagrammatic illustration of an apparatus for sensing a relative position between a first shaft and a second shaft having a L-shaped flux collector apparatus, according to an embodiment of the present invention.
Figure 12:
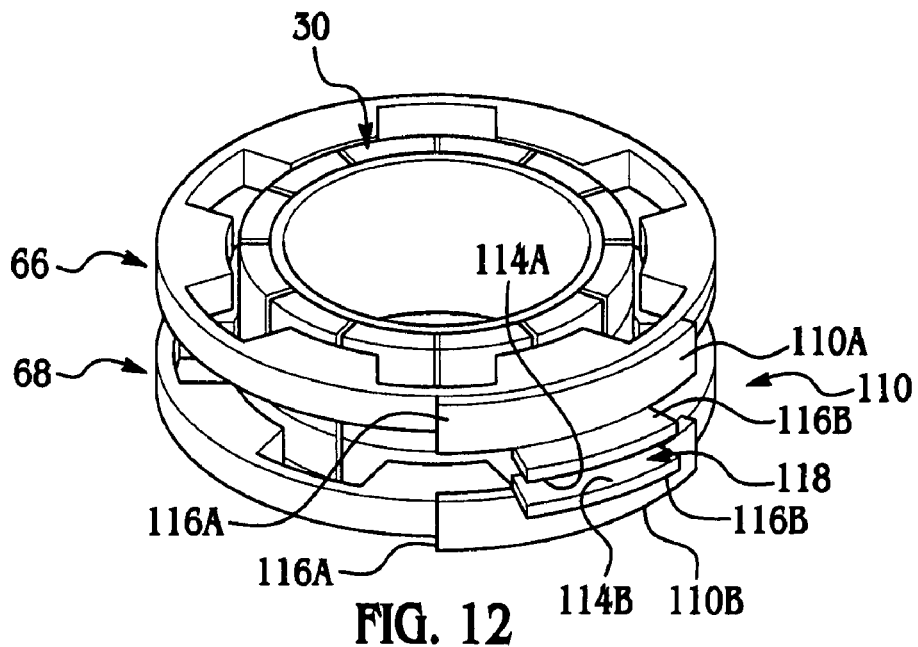
FIG. 12 is a diagrammatic illustration of an apparatus for sensing a relative position between a first shaft and a second shaft having a L-shaped flux collector apparatus, according to another embodiment of the present invention.

With reference to FIGS. 11, 12, 19, 20, and 22, the each collector 110A,110B may have an L-shaped cross section. For example, in FIGS. 11, 12, and 20, the collectors 110A, 110B are similar to the Z-shaped collectors 110A,110B, but lack the side sections 116C. In FIG. 11, the second surface 114A,114B is formed by the tooth extension 116B and is coplanar with the inner surface of the base section 116A. In FIG. 12, the second surfaces 114A,114B are spaced inward of the inner surface of the base section 116A such that the gap 118 is smaller.

Figure 21:
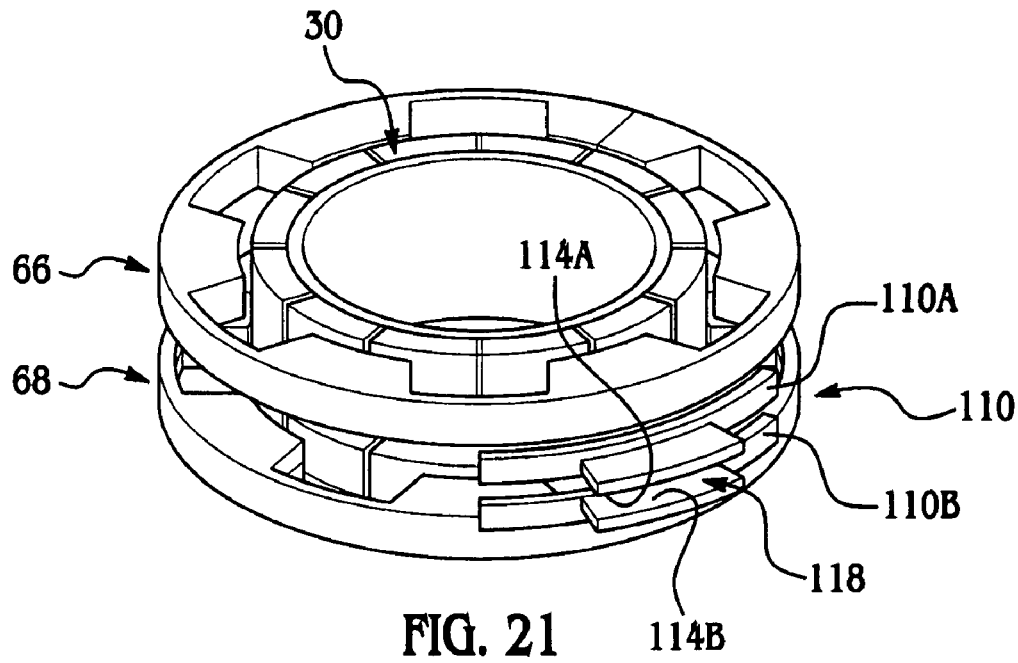
FIG. 21 is a diagrammatic illustration of an L-shaped flux collector, according to another embodiment of the present invention; and, FIG. 22 is a diagrammatic illustration of an L-shaped flux collector, according to still another embodiment of the present invention.

With specific reference to FIG. 21, base section 116A of each collector 110A,110B is within the outer radius of the plates 66,68, while the tooth extension 116B extend outside of the outer radius of the plates 66,68.

Figure 22:
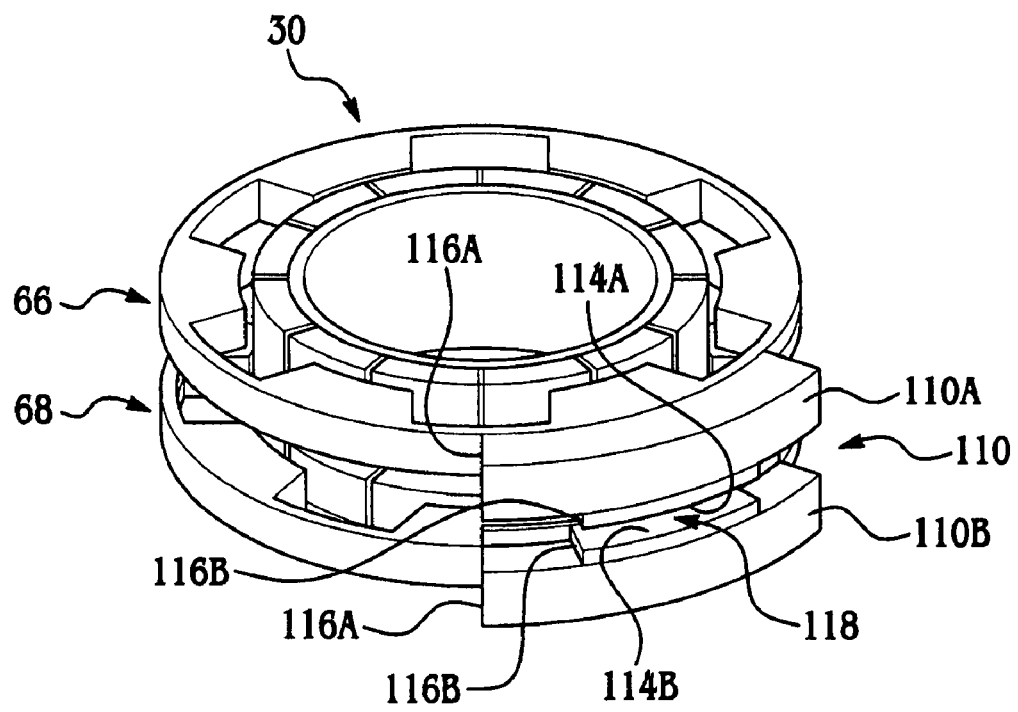

With specific reference to FIG. 22, the tooth extensions 116B extend inward from the respective base section 116A such that the gap 118 is smaller.

The flux collectors 110A,110B may be placed fully within/ between the stator plates 66,68, i.e., within the outer radius thereof, partially within and partially outside of the stator plates 66,68, wholly outside of the stator plates 66,68.

In one aspect of the present invention, the flux collectors 110A,110B are uniformly thick along the axial direction to improve the radial field variation measured by the sensing device 102.

Other shapes may also be used. For example, each flux collector may have a square or rectangular cross-section.

Other variations in the apparatus 10, including modifications/variations in the teeth, rotor, and stator plates may be found in commonly assigned U.S. Pat. Nos. 7,158,233 and 7,174,795, both of which are hereby incorporated by reference.

Obviously, many modifications and variations of the present invention are possible in light of the above teachings. The invention may be practiced otherwise than as specifically described within the scope of the appended claims.

What is claimed is:

1. An apparatus for measuring the relative displacement between a first shaft and a second shaft, comprising:
   a first rotor assembly being coupled to the first shaft and being centered on an axis;
   at least one magnet having a magnetic field and being disposed on the first rotor assembly;

a second rotor assembly being coupled to the second shaft, the first and second rotor assemblies being coaxial, the second rotor assembly having a first stator plate and a second stator plate, the first and second stator plates having a circular base section and a plurality of teeth extending from the base section in a direction radial of the axis;

a flux collector arrangement having a first collector and a second collector, the first and second collectors having a curved first surface, the curved first surface of the first and second collectors being spaced from an outer rim of the base section of the first and second stator plates, respectively, the first and second collectors having a second surface, the second surface of the first collector and the second surface of the second collector being parallel and forming a gap; and a sensing device disposed within the gap for sensing a magnetic flux of the magnetic field.

2. An apparatus, as set forth in claim 1, further comprising a compliant member coupled between the first and second shafts for allowing relative movement therebetween.

3. An apparatus, as set forth in claim 1, further comprising a retaining member to hold the first and second stator plates and fixing the relative position thereof, respectively, and being fixedly coupled to the lower shaft.

4. An apparatus, as set forth in claim 1, the sensing device being mounted to a stationery member or to a bearing surface.

5. An apparatus, as set forth in claim 1, the first rotor assembly having a circumference and a plurality of slots or flats spaced evenly around the circumference, the apparatus including a plurality of magnets, each magnet being located in one of the slots or flats.

6. An apparatus, as set forth in claim 5, each magnet having first and second parallel surfaces and four side surfaces, the first and second parallel surfaces being parallel to the axis, the first and second parallel surface being square.

7. An apparatus, as set forth in claim 5, the plurality of magnets being in a single row around the circumference of the first rotor assembly.

8. An apparatus, as set forth in claim 5, the plurality of magnets being in two rows around the circumference of the first rotor assembly.

9. An apparatus, as set forth in claim 1, wherein the first and second flux collectors are circular, surrounding the outer rim of the respective stator plate.

10. An apparatus, as set forth in claim 1, wherein the first and second flux collectors surround at least a portion of the outer rim of the respective stator plate.

11. An apparatus, as set forth in claim 10, wherein each stator plate includes n teeth, and the first and second flux collectors surround 1/n of the outer rim of the respective stator plate.

12. An apparatus, as set forth in claim 1, wherein the flux collectors have a Z-shaped cross-section.

13. An apparatus, as set forth in claim 1, wherein the flux collectors have an L-shaped cross-section.

14. An apparatus, as set forth in claim 1, wherein the flux collectors have a rectangular cross-section.

15. An apparatus, as set forth in claim 1, wherein the flux collectors have a square cross-section.

16. An apparatus, as set forth in claim 1, wherein the flux collectors have a base section and a tooth extension extending in a direction away from the base portion.

17. An apparatus, as set forth in claim 1, wherein the first and second collectors are composed at least partially from steel.

18. An apparatus, as set forth in claim 1, wherein the first and second collectors are composed at least partially from laminated steel.

19. An apparatus for measuring the relative displacement between a first shaft and a second shaft, comprising:

a first rotor assembly being coupled to the first shaft and being centered on an axis, the first rotor assembly having a circumference and a plurality of slots or flats spaced evenly around the circumference;

a plurality of magnets having a magnetic field and being disposed on a respective slot or flat of the first rotor assembly;

a second rotor assembly being coupled to the second shaft, the first and second rotor assemblies being coaxial, the second rotor assembly having a first stator plate and a second stator plate, the first and second stator plates having a circular base section and a plurality of teeth extending from the base section in a direction radial of the axis;

a flux collector arrangement having a first collector and a second collector, the first and second collectors having a curved first surface, the curved first surface of the first and second collectors being spaced from an outer rim of the base section of the first and second stator plates, respectively, the first and second collectors having a tooth extension having a second surface and extending from the respective base section, the second surface of the tooth portion of the first collector and the second surface of the tooth portion of the second collector being parallel and forming a gap; and a sensing device disposed within the gap for sensing a magnetic flux of the magnetic field.

20. An apparatus, as set forth in claim 19, wherein the magnets are in one or more rows around the circumference of the first rotor assembly.

* * * * *